United States Patent
Iijima (10) Patent No.: US 8,082,803 B2
(45) Date of Patent: Dec. 27, 2011

(54) ELECTROMAGNETIC FLOW METER HAVING A CUT GROOVE FORMED IN THE FLANGE FOR HOLDING THE LINER IN POSITION

(75) Inventor: Takuya Iijima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 12/472,974

(22) Filed: May 27, 2009

(65) Prior Publication Data

US 2009/0293635 A1 Dec. 3, 2009

(30) Foreign Application Priority Data

May 28, 2008 (JP) ............... P2008-139991

(51) Int. Cl.
*G01F 1/58* (2006.01)
(52) U.S. Cl. ..................... 73/861.11
(58) Field of Classification Search ............ None
See application file for complete search history.

(56) References Cited

U.S. PATENT DOCUMENTS

| | | | |
|---|---|---|---|
| 4,592,886 A * | 6/1986 | Mannherz | 264/262 |
| 4,631,969 A * | 12/1986 | Schmoock | 73/861.12 |
| 5,385,055 A * | 1/1995 | Kubota et al. | 73/861.12 |
| 5,664,315 A | 9/1997 | Unterseh | |
| 6,000,278 A * | 12/1999 | Hystad | 73/46 |
| 6,817,249 B2 * | 11/2004 | Yamazaki | 73/861.12 |
| 2004/0149046 A1* | 8/2004 | Yamazaki | 73/861.12 |
| 2009/0178489 A1* | 7/2009 | Iijima | 73/861.11 |

FOREIGN PATENT DOCUMENTS

| | | |
|---|---|---|
| CN | 1194367 A | 9/1998 |
| CN | 2669143 Y | 1/2005 |
| GB | 1077129 | 7/1967 |
| JP | 55-69019 | 5/1980 |
| JP | 55069019 A * | 5/1980 |
| JP | 57-88322 | 6/1982 |
| JP | 61-16493 | 5/1986 |
| JP | 61-265530 | 11/1986 |
| JP | 61-294316 | 12/1986 |
| JP | 62-96526 | 6/1987 |
| JP | 2-39214 | 10/1990 |
| JP | 3-124 | 1/1991 |
| JP | 5-157600 | 6/1993 |
| JP | 8-178719 | 7/1996 |
| JP | 2002-39821 | 2/2002 |

OTHER PUBLICATIONS

Chinese Office Action issued on Jun. 24, 2011, in Chinese Application 200910145661.2 (with English Language Translation).
Korean Office Action issued Feb. 28, 2011, in Patent Application No. 10-2009-0045334 (with English Abstract).

* cited by examiner

*Primary Examiner* — Harshad Patel
(74) *Attorney, Agent, or Firm* — Oblon, Spivak, McClelland, Maier & Neustadt, L.L.P.

(57) ABSTRACT

Provided is an electromagnetic flow meter configured to measure a flow rate of a measurement target fluid. The electromagnetic flow meter includes: a measurement pipe having a hollow cylindrical shape and allowing the measurement target fluid to flow inside; flanges provided on both ends of the measurement pipe, respectively; and a lining portion. Each of the flanges includes a cut groove formed in a circumferential direction of the measurement pipe. The cut groove has a curved inner surface. The lining portion is formed so as to cover an inner surface of the measurement pipe and the cut grooves.

1 Claim, 7 Drawing Sheets

ELECTROMAGNETIC FLOW METER HAVING A CUT GROOVE FORMED IN THE FLANGE FOR HOLDING THE LINER IN POSITION

CROSS REFERENCE TO RELATED APPLICATION

This application is based upon and claims the benefit of priority from Japanese Patent Application No. 2008-139991 filed on May 28, 2008, the entire contents of which are incorporated herein by reference.

BACKGROUND OF THE INVENTION

1. Field of the Invention

The present invention relates to an electromagnetic flow meter configured to measure a flow rate of a fluid. More specifically, the present invention relates to a technique to apply a resin lining on an inner surface of a measurement pipe in which a measurement target fluid is to flow.

2. Description of the Related Art

An electromagnetic flow meter is configured to measure a flow rate by applying an electric current to a coil to generate a magnetic field inside a measurement pipe, and by detecting magnitude of an electromotive force generated in proportion to the electric conductivity of a liquid flowing inside the measurement pipe. Generally, a resin lining made of fluororesin, polyurethane resin or the like is applied on an inner surface of the measurement pipe of the above-described electromagnetic flow meter in order to prevent embrittlement.

Transfer molding is known as a method for applying a resin lining in an electromagnetic flow meter. This method involves the following steps: fitting molds to both ends and the inside of a measurement pipe; heating these molds up to a temperature close to a melting point of resin used for lining; and pressurizing melted resin to feed the resin into clearances between the measurement pipe and the molds.

In another method for applying a resin lining, the method involves the following steps: fitting molds to both ends and the inside of a measurement pipe; and pressurizing melted resin without heating the resin to feed the resin into clearances between the measurement pipe and the molds.

Further, in another method for applying a resin lining, the method involves the following steps: fitting molds to both ends and the inside of a measurement pipe; putting resin pellets used for lining into clearances between the measurement pipe and the molds in advance; heating the resin pellets until the pellets are melted in the clearances between the measurement pipe and the molds; and thereafter, pressurizing and molding the resin by clipping the molds with a press machine or the like.

Regarding the conventional electromagnetic flow meter including the measurement pipe to which the resin lining is applied, there is known a technique for preventing the resin lining from being detached from the measurement pipe. This technique forms the lining by feeding the resin after attaching a cylindrical porous plate serving as a reinforcing member onto the inner surface of the measurement pipe.

Japanese Examined Patent Application Publication No. 03-124 (Patent Document 1) discloses a forming method of pipe lining for an electromagnetic flow meter. According to this method, a porous plate is used as a reinforcing member buried in resin. The porous plate is firstly wound cylindrically so as to be inserted into a measurement pipe, thereby forming a porous pipe body. Next, a spacer is fitted to an outer peripheral surface of this porous pipe body. The porous pipe body provided with the spacer is then inserted into the measurement pipe and fixed thereto. Then, the measurement pipe body is coated with resin by insertion molding. In this method, before the porous pipe body is coated with resin, the two end edges in a circumferential direction of the porous pipe body are shifted relatively to each other in an axial direction to expand the diameter of the porous pipe body, while being in close contact with each other, until an outer peripheral surface of the spacer comes in close contact with an inner peripheral surface of the measurement pipe.

Japanese Examined Utility Model Application Publication No. 02-39214 (Patent Document 2) discloses an electromagnetic flow meter including a lining that is applied on an inner surface of a conducting pipe by means of insertion molding. This electromagnetic flow meter includes: a cylinder provided with a fastener which is fixed to the inner surface of the conducting pipe and which is configured to establish fastening integrally with the lining; a reinforcing member provided with through holes formed at least along a seam of the cylinder; and a lining fastener which is provided on the conductive pipe to face the though holes and which is configured to prevent detachment of the lining.

Japanese Examined Utility Model Application Publication No. 61-16493 (Patent Document 3) discloses a technique to prevent detachment of a resin lining from a measurement pipe without using a reinforcing member. According to this technique, dovetail grooves are formed on an inner surface of the measurement pipe either in a circumferential direction or in an axial direction, and the lining is formed by feeding resin thereafter.

SUMMARY OF THE INVENTION

According to the above-described techniques disclosed in Patent Document 1 and Patent Document 2, the cylindrical porous plate is used for avoiding detachment of the resin lining from the measurement pipe. However, advanced process techniques are required for forming the porous plate into a cylindrical shape. Moreover, advanced forming techniques are required for welding the cylindrical porous plate to the measurement pipe in order to avoid detachment of the cylindrical porous plate from the measurement pipe.

Further, in order to feed the melted resin into the clearance between the cylindrical porous plate and the measurement pipe and into pores on the cylindrical porous plate without including any bubbles in the resin, it is necessary to employ a method, such as transfer molding, injection molding or insertion molding, of heating molds to raise the temperature thereof, and thereafter pressuring the melted resin to feed the resin into the molds. As a result, these techniques require large costs for formation as well as the advanced forming techniques.

In addition, according to the above-described technique disclosed in Patent Document 3, the dovetail grooves with the width gradually increased toward its bottom are formed on the inner surface of the measurement pipe. However, process costs will become higher when numerous dovetail grooves are formed.

Moreover, even if the dovetail grooves are successfully formed at the ends of the measurement pipe, it is still difficult to form the dovetail grooves deep inside the measurement pipe. In order to feed the resin to sharp portions on tip ends of the dovetail grooves without including bubbles therein, it is necessary to employ a method such as transfer molding, injection molding or insertion molding. Accordingly, large costs are required for formation. In addition, the advanced forming techniques are required as well.

An object of the present invention is to provide an electromagnetic flow meter in which a resin lining is prevented from detaching from a measurement pipe at low costs by use of simple process techniques and forming techniques.

A first aspect of the present invention provides an electromagnetic flow meter configured to measure a flow rate of a measurement target fluid. The electromagnetic flow meter according to the first aspect comprises: a measurement pipe having a hollow cylindrical shape and allowing the measurement target fluid to flow inside; flanges provided on both ends of the measurement pipe, respectively; and a lining portion. Here, each of the flanges includes a cut groove formed in a circumferential direction of the measurement pipe, the cut groove has a curved surface whose cross section is in an arc shape, and the lining portion is formed so as to cover an inner surface of the measurement pipe and the cut grooves of the respective flanges.

A second aspect of the present invention provides an electromagnetic flow meter configured to measure a flow rate of a measurement target fluid. The electromagnetic flow meter according to the second aspect comprises: a measurement pipe having a hollow cylindrical shape and allowing the measurement target fluid to flow inside; flanges provided on both ends of the measurement pipe, respectively; and a lining portion. Here, each of the flanges includes a convex portion formed in a circumferential direction of the measurement pipe, the convex portion has a curved surface whose cross section is in an arc shape, and the lining portion is formed so as to cover an inner surface of the measurement pipe and the convex portions of the respective flanges.

A third aspect of the present invention provides an electromagnetic flow meter configured to measure a flow rate of a measurement target fluid. The electromagnetic flow meter according to the third aspect comprises: a measurement pipe having a hollow cylindrical shape and allowing the measurement target fluid to flow inside; flanges provided on both ends of the measurement pipe, respectively; O-rings; and a lining portion. Here, each of the flanges includes a cut groove formed in a circumferential direction of the measurement pipe, the cut groove has a curved surface whose cross section is in an arc shape, the O-rings are provided in the respective grooves, and the lining portion is formed so as to cover an inner surface of the measurement pipe and the O-rings.

According to the present invention, provided is an electromagnetic flow meter in which a resin lining is prevented from detaching from a measurement pipe at low costs by use of simple process techniques and forming techniques.

DETAILED DESCRIPTION OF THE PREFERRED EMBODIMENTS

Hereinafter, embodiments of the present invention will be described below in detail with reference to the accompanying drawings.

First Embodiment

Figure 1:
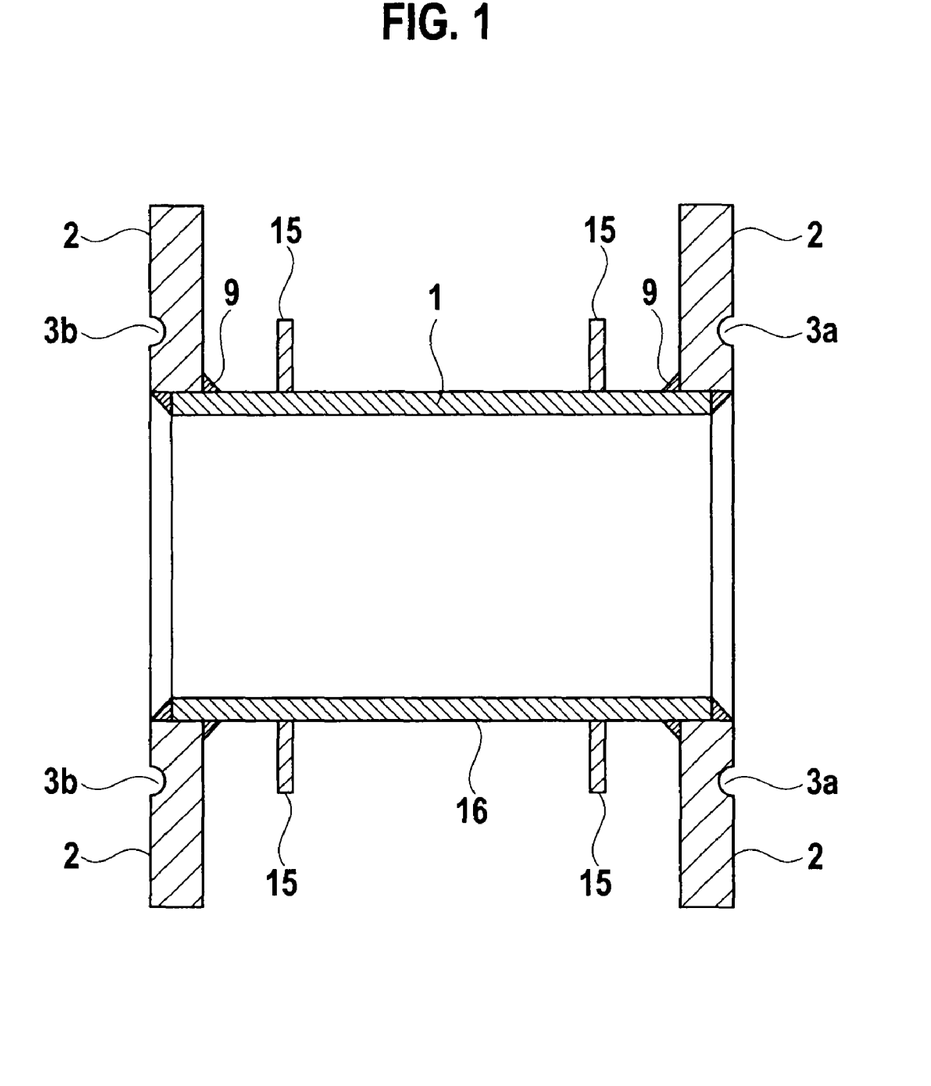
FIG. 1 is a cross-sectional view of a pipe body constituting an electromagnetic flow meter according to a first embodiment of the present invention, which shows the pipe body before being applied with a resin lining.

As shown in FIG. 1, a pipe body 16 constituting an electromagnetic flow meter according to a first embodiment of the present invention includes a measurement pipe 1 in which a measurement target fluid is to flow, a pair of flanges 2 welded onto both ends of the measurement pipe 1 for establishing connection to piping (not shown), and a pair of content container chamber plates 15 welded to an outer peripheral surface of the measurement pipe 1 for forming a chamber for containing contents such as coils. The measurement pipe 1 is made of metal or an insulative material such as a ceramic.

Figure 2:
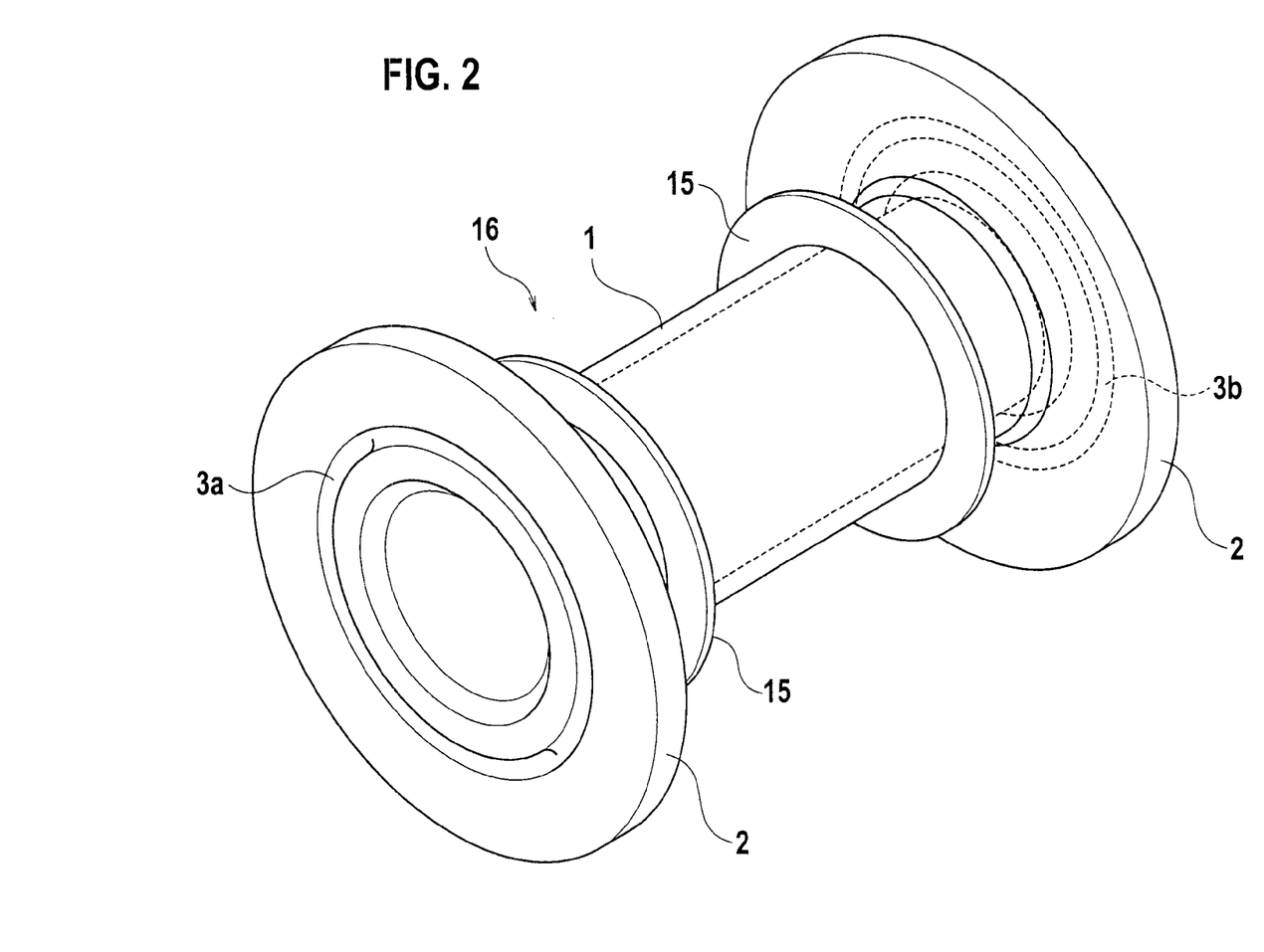
FIG. 2 is a perspective view of the pipe body constituting the electromagnetic flow meter according to the first embodiment of the present invention, which shows the pipe body before being applied with the resin lining.

The flanges 2 are provided with cut grooves 3a and 3b, respectively, which are formed in a circumferential direction of the measurement pipe 1. Each of the cut grooves 3a and 3b is formed into a curved surface having an arc-shaped cross-section. This arc is preferably a semicircle. The cut grooves 3a and 3b are formed by cutting, for example. Note that reference numeral 9 denotes a welded portion. As shown in FIG. 2, the flanges 2 welded onto the both ends of the measurement pipe 1 are provided with the cut grooves 3a and 3b formed in the circumferential direction of the measurement pipe 1, respectively.

The pipe body 16 shown in FIG. 1 is applied with a resin lining made of fluororesin, polyurethane resin or the like. The resin lining can be applied by using a publicly known method, such as a method of fitting molds to both ends and the inside of the measurement pipe 1 and then pressurizing the melted resin to feed the resin into clearances between the measurement pipe 1 and the molds.

Meanwhile, as another resin lining method, it is also possible to use a method of fitting molds to the both ends and the inside of the measurement pipe 1, putting resin pellet used for lining into a clearance between the measurement pipe 1 and the molds in advance, heating the resin pellet used for lining until it melts in the clearance between the molds and the measurement pipe 1, and then pressurizing the resin by clamping the molds with a pressing machine or the like to mold the resin.

Figure 3:
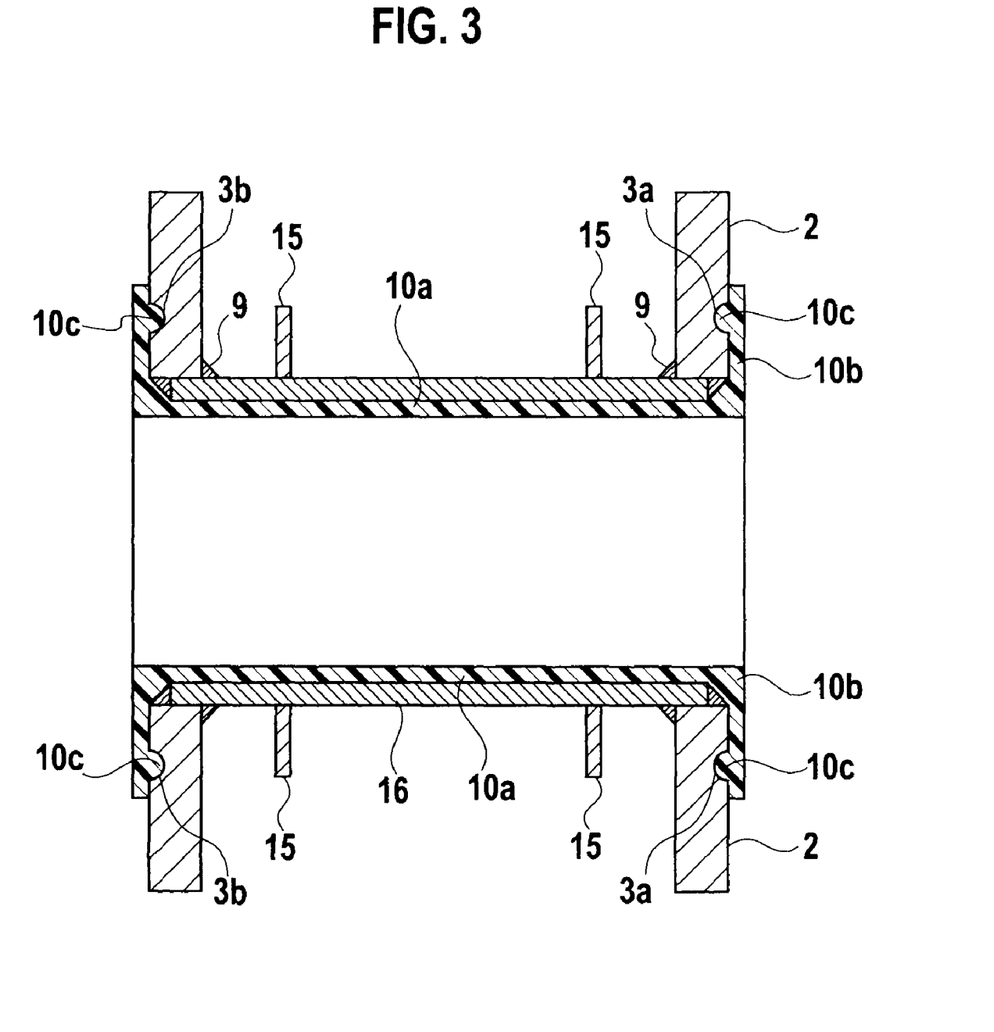
FIG. 3 is a cross-sectional view of the pipe body constituting the electromagnetic flow meter according to the first embodiment of the present invention, which shows the pipe body after being applied with the resin lining.

As shown in FIG. 3, the resin lining is applied on an inner surface of the measurement pipe 1 and partially on a surface (the surface to be connected to the piping) of each of the flanges 2, thereby forming a resin lining portion 10a and lining flare portions 10b. Moreover, the resin lining enters the cut grooves 3a and 3b at the time of this resin lining. Thereby, convex portions 10c having either a circular segment shape or a semicircular shape are formed in the circumferential direction of the measurement pipe 1 on the lining flare portions 10b. A close contact thus accomplished between the convex portions 10c of the lining flare portions 10b and the cut grooves 3a and 3b blocks a flow of external air from outside into the resin lining portion 10a. In this way, the resin lining portion 10a is prevented from being detached toward the inside of the measurement pipe 1.

Figure 4:
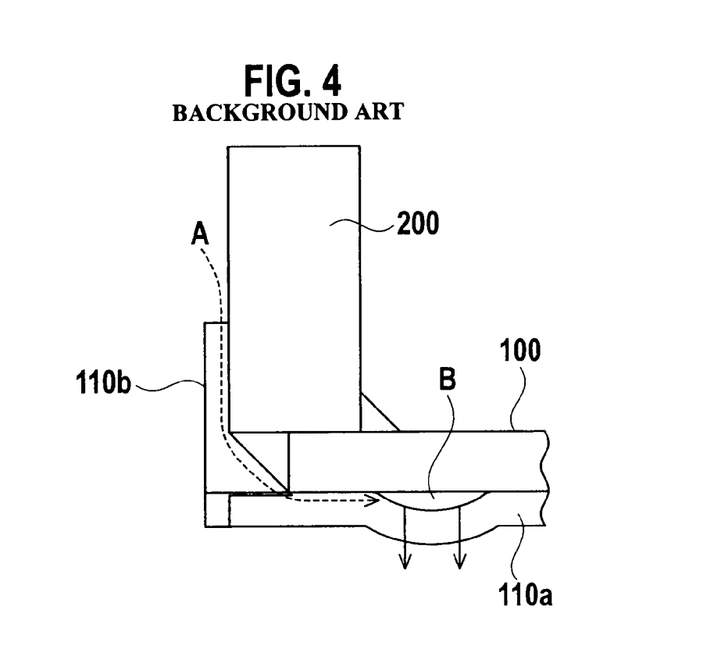
FIG. 4 is a cross-sectional view of an electromagnetic flow meter of a conventional art.

In an electromagnetic flow meter of a conventional art shown in FIG. 4, a resin lining portion 110a does not adhere to an inner surface of a measurement pipe 100. Accordingly, when the pressure inside the measurement pipe 100 becomes negative relative to the outside, a bubble space B may be formed between the inner surface of the measurement pipe 100 and the resin lining portion 110a. The electromagnetic flow meter of the conventional art does not have a structure to allow a lining flare portion 110b to block an external air flow A (and its pressure). As a result, the external air flow A may flow into the bubble space B via a clearance between the inner surface of the measurement pipe 100 and the resin lining portion 110a. When the size of the bubble space B increases, the resin lining portion 110a may possibly be detached from the inner surface of the measurement pipe 100.

Figure 5:
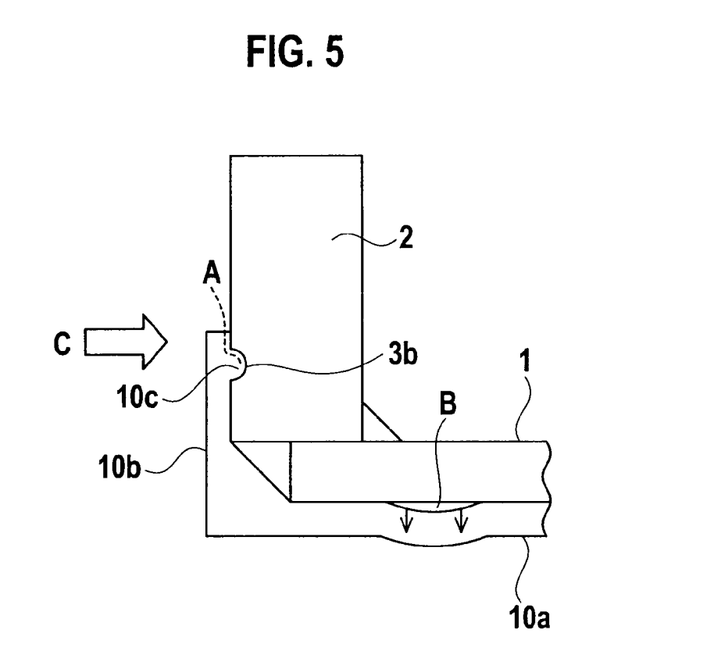
FIG. 5 is a cross-sectional view of the electromagnetic flow meter according to the first embodiment of the present invention.

However, according to the electromagnetic flow meter according to the first embodiment of the present invention shown in FIG. 5, the cut grooves 3a and 3b are formed in the circumferential direction of the measurement pipe 1 in the flanges 2 that are welded onto the both ends of the measurement pipe 1. Then, a tightening force C from the piping connected to the flanges 2 brings the convex portions 10c of the lining flare portions 10b into close contact with the cut grooves 3a and 3b. Consequently, it is possible to block the external air flow A into the bubble space B and thereby to prevent the resin lining portion 10a from being detached from the inner surface of the measurement pipe 1.

Specifically, assume here that a pressure of a bubble B in an initial state is P1 and its volume in this state is V1, and that a pressure of the bubble B when a negative pressure exists inside the measurement pipe is P2 and its volume in that state is V2. According to the Boyle's law, a relation of the above is $P1 \times V1 = P2 \times V2$. Therefore, if the external air flow A does not enter the bubble B, the relation of the aforementioned formula holds true. Accordingly, the pressure P2 decreases as the volume V2 increases. That is, reduction in the pressure inside the bubble B decreases a force to press the resin lining 19a into the measurement pipe. Hence, detachment of the resin lining portion 10a is avoided.

As described above, according to the electromagnetic flow meter of the first embodiment of the present invention, entry of the external air into the bubble formed between the inner surface of the measurement pipe 1 and the resin lining portion 10a is prevented by the close contact of the cut grooves 3a and 3b with the convex portions 10c of the lining flare portions 10b that are formed so as to cover these cut grooves 3a and 3b. In this way, the resin lining portion 10a is hardly detached from the measurement pipe 1.

Moreover, the cut grooves 3a and 3b are formed more easily than dovetail grooves of a conventional electromagnetic flow meter. Further, no cylindrical porous plate is used in contrast to the conventional electromagnetic flow meter. Accordingly, it is possible to form the resin lining by a simple method involving processing such as pressuring and injecting the melted resin into the clearance between the measurement pipe 1 and the molds.

Meanwhile, it is possible to reduce process costs as it is relatively easy to form the cut grooves 3a and 3b in the circumferential direction of the measurement pipe 1. Since no cylindrical porous plate is used unlike the conventional electromagnetic flow meter, it is possible to reduce material costs. Moreover, it is not required to use an advanced can manufacturing technique of, for example, forming a cylindrical porous plate accurately into a cylindrical shape and attaching the plate to the inner surface of the measurement pipe while avoiding detachment. Accordingly, it is easier to manufacture the pipe body 16 of the electromagnetic flow meter.

In addition, since no cylindrical porous plate is used, the resin lining can be formed without using an advanced process technique of, for example, heating molds up to a high temperature and then injecting the melted resin from a pressurizer at a high pressure.

Here, in the electromagnetic flow meter according to the first embodiment, the shape of the cut grooves 3a and 3b can be changed as follows. In the modifications described below, the same constituents as those in the configuration of the electromagnetic flow meter according to the first embodiment will be designated by the same reference numerals as those used in the first embodiment, and duplicate explanation will be omitted.

Figure 6:
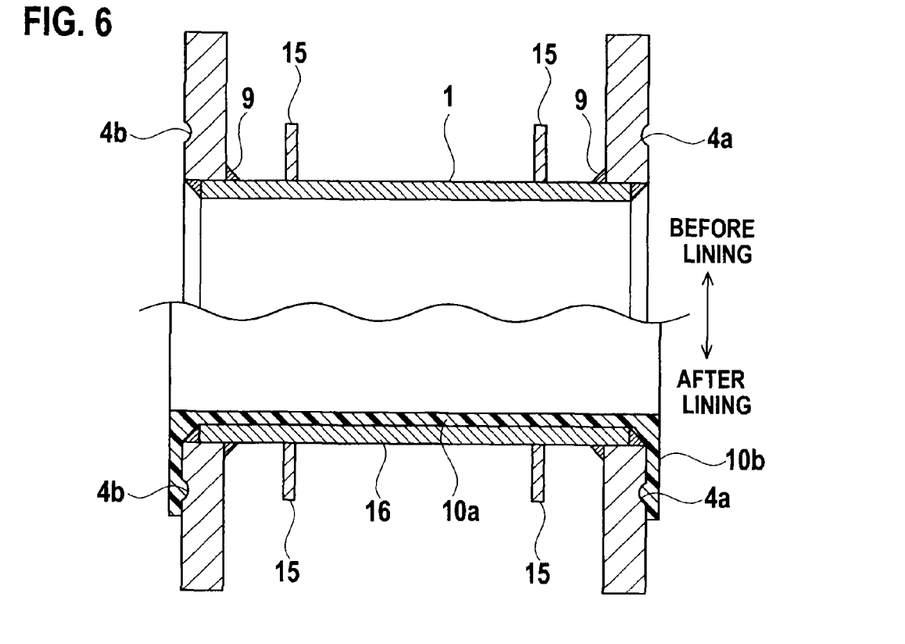
FIG. 6 is a cross-sectional view of a pipe body constituting an electromagnetic flow meter according to a first modification of the first embodiment of the present invention.

FIG. 6 is a cross-sectional view of a pipe body 16 constituting an electromagnetic flow meter according to a first modification of the first embodiment of the present invention. Here, an upper half of FIG. 6 shows a state before a resin lining is applied, while a lower half thereof shows a state after the resin lining is applied.

In the electromagnetic flow meter according to the first modification of the first embodiment, cut grooves 4a and 4b are formed in the circumferential direction of the measurement pipe 1 instead of the above-described cut grooves 3a and 3b. These cut grooves 4a and 4b are formed to have a cross section shaped like an ellipsoidal segment. In addition to the operation and effect similar to those in the electromagnetic flow meter according to the first embodiment, this electromagnetic flow meter has an effect to further reduce costs because the cut grooves are formed more easily.

Figure 7:
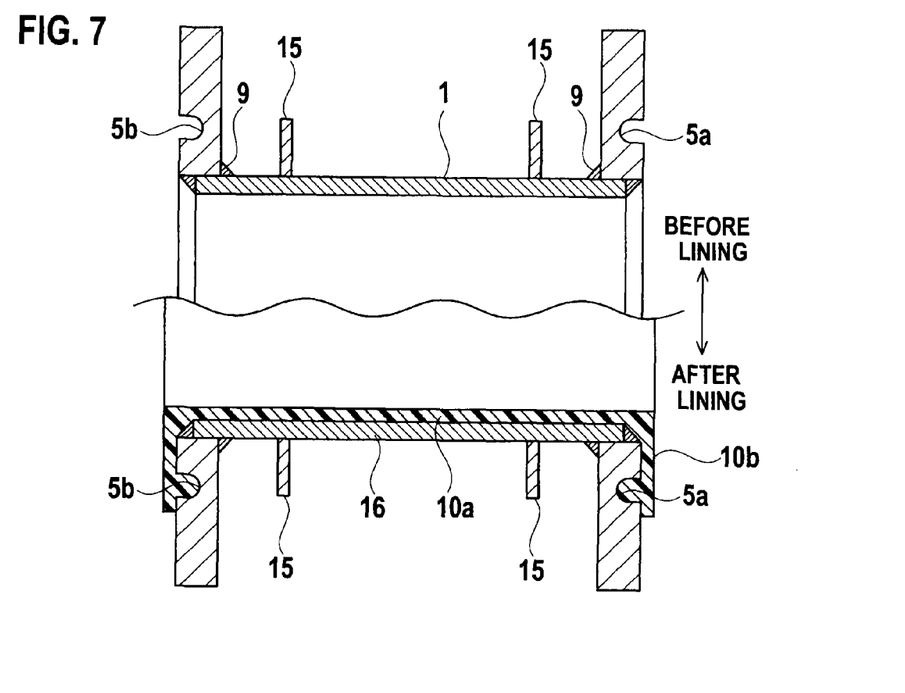
FIG. 7 is a cross-sectional view of a pipe body constituting an electromagnetic flow meter according to a second modification of the first embodiment of the present invention.

FIG. 7 is a cross-sectional view of a pipe body 16 constituting an electromagnetic flow meter according to a second modification of the first embodiment of the present invention. Here, an upper half of FIG. 7 shows a state before a resin lining is applied, while a lower half thereof shows a state after the resin lining is applied.

In the electromagnetic flow meter according to the second modification of the first embodiment, cut grooves 5a and 5b are formed in the circumferential direction of the measurement pipe 1 instead of the above-described cut grooves 3a and 3b. These cut grooves 5a and 5b are formed to have a cross section shaped like an ellipsoidal segment or a circular segment, and to have a deeper depth than the cut grooves 3a and 3b. In addition to the operation and effect similar to those in the electromagnetic flow meter according to the first embodiment, this electromagnetic flow meter can maintain a high sealing performance. Therefore, it is possible to prevent entry of the external air into the bubble to be formed between the inner surface of the measurement pipe 1 and the resin lining portion 10a more reliably.

As described above, the shape of the cut grooves to be formed in the flanges 2 welded to the both ends of the measurement pipe 1 constituting the electromagnetic flow meter according to the first embodiment of the present invention is not limited only to the semicircular shape, but may be of any shape as long as such a shape is formed by cutting the inner surface into a curved surface in the circumferential direction of the measurement pipe 1. The cut grooves formed in the flanges 2 and the convex portions formed on the lining flare portions 10b can establish a sealing in the form of a circumferential line. This sealing can avoid entry of the external air into the bubble to be formed between the inner surface of the measurement pipe 1 and the resin lining portion 10a, and accordingly can prevent the resin lining portion 10a from being detached from the inner surface of the measurement pipe 1.

Second Embodiment

Figure 8:
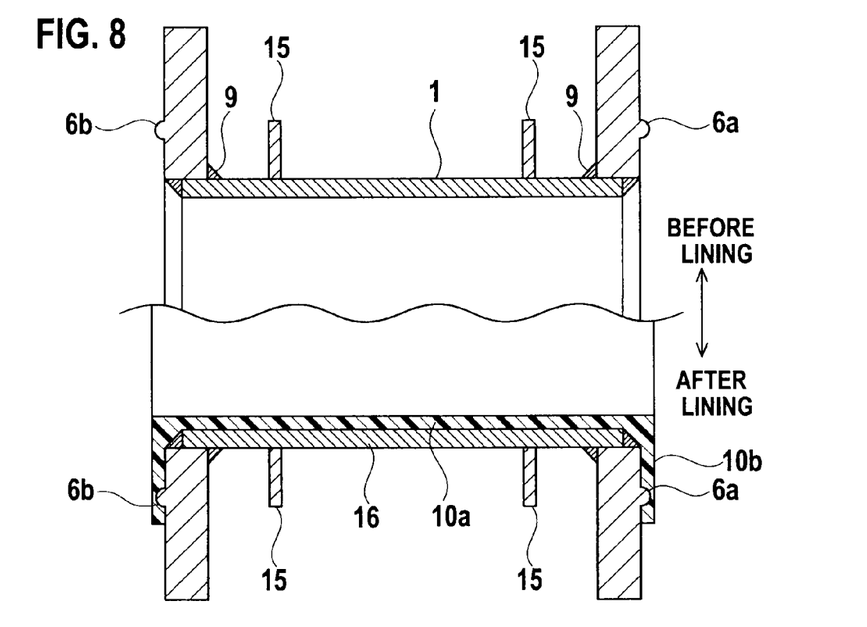
FIG. 8 is a cross-sectional view of a pipe body constituting an electromagnetic flow meter according to a second embodiment of the present invention.

FIG. 8 is a cross-sectional view of a pipe body 16 constituting an electromagnetic flow meter according to a second embodiment of the present invention. Here, an upper half of FIG. 8 shows a state before a resin lining is applied, while a lower half thereof shows a state after the resin lining is applied. In the following, the same constituents as those in the configuration of the electromagnetic flow meter according to the first embodiment will be designated by the same reference numerals as those used in the first embodiment, and duplicate explanation will be omitted.

In the electromagnetic flow meter according to the second embodiment of the present invention, convex portions 6a and 6b are formed in a circumferential direction of the measurement pipe 1 instead of the cut grooves 3a and 3b described in the first embodiment of the present invention. These convex portions 6a and 6b are formed to have a semicircular cross section.

In the electromagnetic flow meter according to the second embodiment of the present invention, the pipe body 16 is applied with a resin lining made of fluororesin, polyurethane resin or the like by use of a publicly-known resin lining method as similar to that used for the electromagnetic flow meter according to the first embodiment of the present invention.

As shown in FIG. 8, the resin lining is applied on the inner surface of the measurement pipe 1 and partially on a surface on one side (the surface to be connected to the piping) of each of the flanges 2, thereby forming the resin lining portion 10a and the lining flare portions 10b. Moreover, the resin lining covers the convex portions 6a and 6b at the time of this resin lining. As a result, semicircular grooves are formed in the circumferential direction of the measurement pipe 1 in the lining flare portions 10b. A close contact thus accomplished between the grooves in the lining flare portions 10b and the convex portions 6a and 6b blocks a flow of external air from outside into the resin lining portion 10a. Thereby, the resin lining portion 10a is prevented from being detached toward the inside of the measurement pipe 1.

It should be noted that the cross section of the convex portions 6a and 6b in the second embodiment of the present invention is not limited only to the semicircular shape, but may be of any shape as long as such a shape is formed to have a curved surface in the circumferential direction of the measurement pipe 1. The convex portions formed on the flanges 2 and the grooves formed in the lining flare portions 10b can establish a sealing in the form of a circumferential line. This sealing can avoid entry of the external air into the bubble to be formed between the inner surface of the measurement pipe 1 and the resin lining portion 10a.

Third Embodiment

Figure 9:
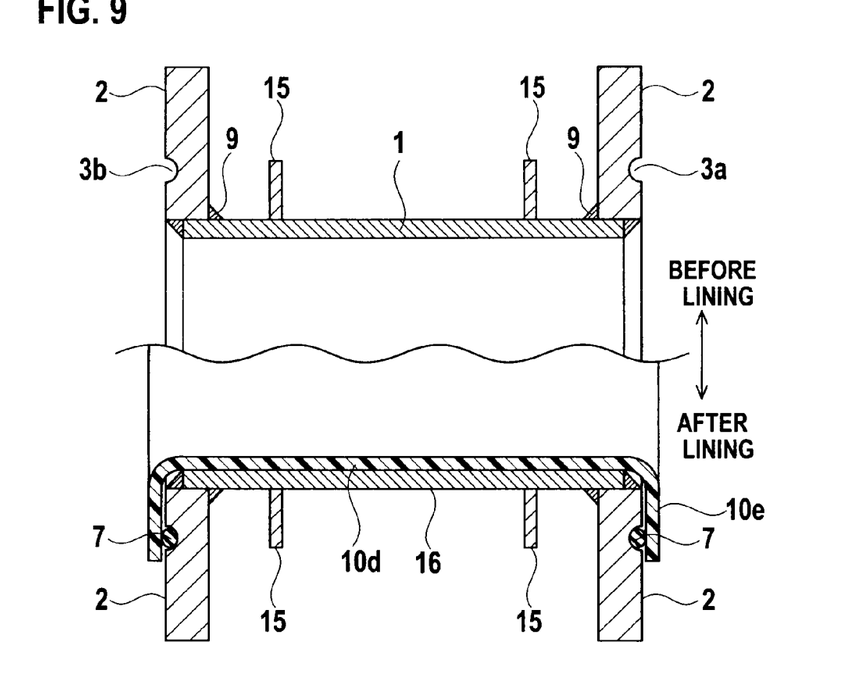
FIG. 9 is a cross-sectional view of a pipe body constituting an electromagnetic flow meter according to a third embodiment of the present invention.

FIG. 9 is a cross-sectional view of a pipe body 16 constituting an electromagnetic flow meter according to a third embodiment of the present invention. Here, an upper half of FIG. 9 shows a state before a resin lining is applied, while a lower half thereof shows a state after the resin lining is applied. In the following, the same constituents as those in the configuration of the electromagnetic flow meter according to the first embodiment will be designated by the same reference numerals as those used in the first embodiment, and duplicate explanation will be omitted.

In the electromagnetic flow meter according to the third embodiment of the present invention, the cut grooves 3a and 3b are formed on the respective flanges 2, like the electromagnetic flow meter according to the first embodiment of the present invention.

In the electromagnetic flow meter according to the third embodiment of the present invention, the pipe body 16 is applied with a resin lining made of fluororesin, polyurethane resin or the like. Here, if the pipe body 16 has a sufficiently large size, the resin lining can be formed by use of the above-described resin lining method such as transfer molding. However, if the pipe body 16 is small, the following resin lining method, which is called a flare forming resin lining method below, is often used. In this method, resin is formed into a pipe-like shape in advance. This resin pipe is then inserted into the measurement pipe 1 having a slightly smaller inside diameter than an outside diameter of the resin pipe. Thereafter, both ends of the resin pipe are spread (to form flares).

Figure 10:
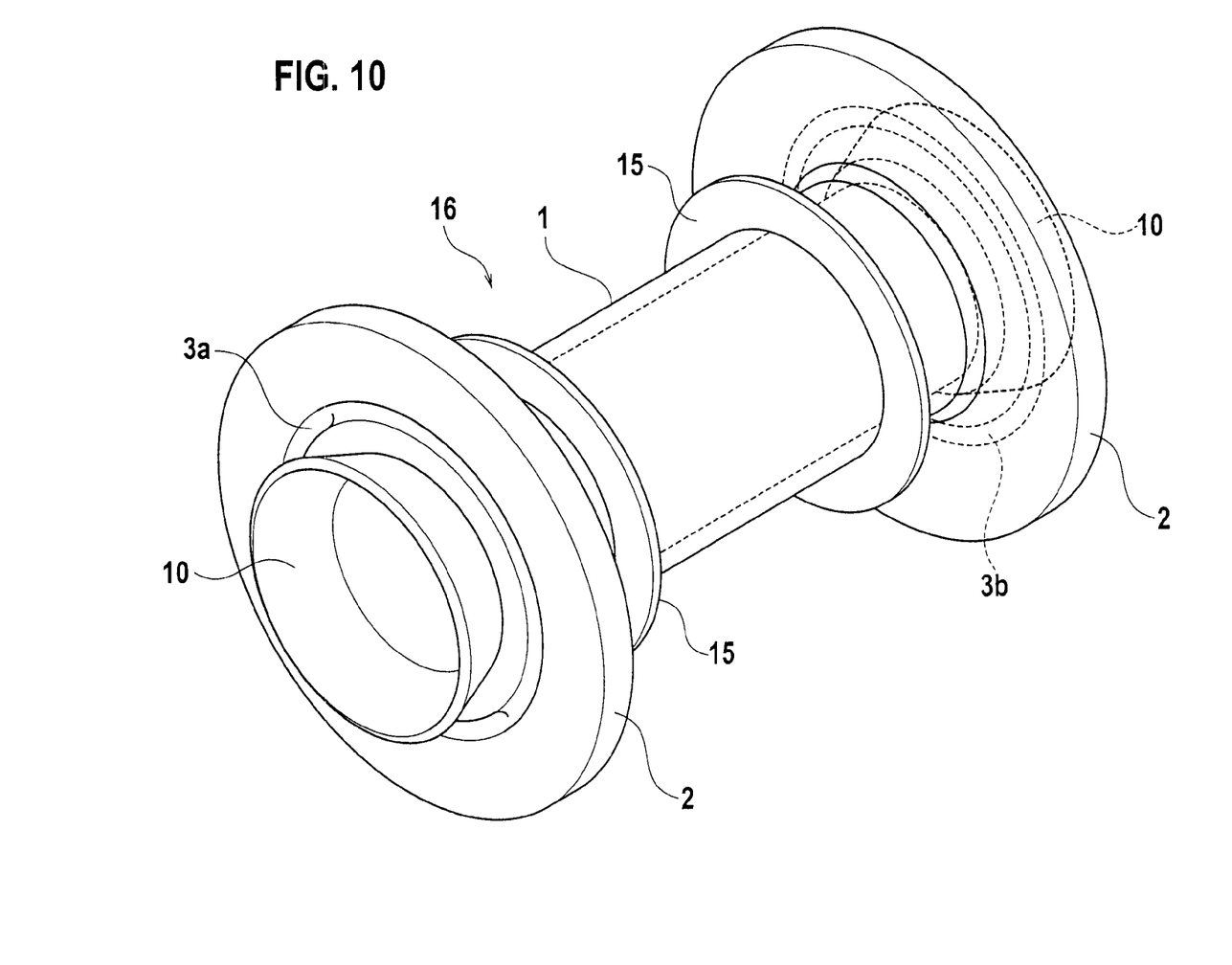
FIG. 10 is a view showing a flare forming resin lining method.

FIG. 10 is a view showing the flare forming resin lining method.

As shown in FIG. 10, when the pipe body 16 is small, pipe-shaped resin 10 having the outside diameter slightly larger than the inside diameter of the pipe body 16 is heated and then inserted into the measurement pipe 1 of the pipe body 16.

Thereafter, the resin lining process is achieved by radially spreading (forming flares using) portions of the inserted pipe-shaped resin 10 hanging out of one end of each of the flanges 2.

In this way, a resin lining portion 10d and a lining flare portion 10e on one end of each of the flanges 2 are formed as shown in FIG. 9.

However, when this flare forming resin lining method is used, no convex portions corresponding to the cut grooves 3a and 3b (that is, the convex portions 10c in FIG. 3) are formed in the lining flare portions 10e in the course of resin lining.

Therefore, in the electromagnetic flow meter according to the third embodiment of the present invention, O-rings 7 are placed in the cut grooves 3a and 3b on the flanges 2, respectively.

The close contact between the O-rings 7 and the cut grooves 3a and 3b blocks a flow of external air from outside into the resin lining portion 10d. Thereby, the resin lining portion 10d is prevented from being detached toward the inside of the measurement pipe 1.

It should be noted that the shape of the cut grooves in the third embodiment of the present invention is not limited only to the semicircular shape, but may be of any shape as long as such a shape is formed into a curved surface in the circumferential direction of the measurement pipe 1. The cut grooves formed in the flanges 2 and the O-rings can establish a sealing in the form of a circumferential line. This sealing prevents entry of the external air into a bubble to be formed between the inner surface of the measurement pipe 1 and the resin lining portion 10d.

The present invention is applicable to a water meter, a gas meter, and the like.

What is claimed is:
1. An electromagnetic flow meter configured to measure a flow rate of a measurement target fluid, comprising:
a measurement pipe having a hollow cylindrical shape and allowing the measurement target fluid to flow inside;

flanges provided on both ends of the measurement pipe, respectively; and a lining portion, wherein each of the flanges includes a flatly-formed front surface facing to a member to be connected and a convex portion formed on the front surface, the convex portion extending in a circumferential direction of the measurement pipe, the convex portion has a curved surface whose cross section is in an arc shape, the convex portion has widths that do not increase toward a top thereof, the lining portion is formed so as to cover an inner surface of the measurement pipe, the front surfaces and the convex portions of the respective flanges, and a part of the lining portion, the part covering the front surface of the flange, is flat and parallel to the front surface.

* * * * *